(12) United States Patent
Tsai

(10) Patent No.: US 11,173,619 B1
(45) Date of Patent: Nov. 16, 2021

(54) EFFORT-SAVING CUTTER

(71) Applicant: HONG JIN INDUSTRY CO., LTD., Taichung (TW)

(72) Inventor: Chung Tsai, Taichung (TW)

(73) Assignee: HONG JIN INDUSTRY CO., LTD., Taichung (TW)

( * ) Notice: Subject to any disclaimer, the term of this patent is extended or adjusted under 35 U.S.C. 154(b) by 0 days.

(21) Appl. No.: 17/092,328

(22) Filed: Nov. 9, 2020

(51) Int. Cl.
  *B26B 13/28* (2006.01)
  *B23D 21/06* (2006.01)

(52) U.S. Cl.
  CPC .............. *B26B 13/28* (2013.01); *B23D 21/06* (2013.01)

(58) Field of Classification Search
  CPC ....... B26B 13/28; B26B 13/285; B26B 17/00; B26B 17/02; B23D 21/06; B25B 7/00; B25B 7/02; B25B 7/04; B25B 7/12; B25B 7/123; B25B 7/18
  See application file for complete search history.

(56) References Cited

U.S. PATENT DOCUMENTS

| 2004/0045174 | A1* | 3/2004 | Nordlin | B26B 17/02 30/194 |
| 2008/0307657 | A1* | 12/2008 | Macsay | B26D 3/169 30/250 |
| 2018/0354044 | A1* | 12/2018 | Nordlin | B23D 21/10 |

* cited by examiner

*Primary Examiner* — Stephen Choi
(74) *Attorney, Agent, or Firm* — Bruce Stone LLP; Joseph A. Bruce

(57) ABSTRACT

A cutter includes a platform, two handles, a blade, a lever, two pawls, a helical spring and a torque spring. The platform is connected to the first handle. The lever includes a ratchet formed at a rear end and a block formed on a side. The blade includes a rear end formed with a slit for receiving the block. The first pawl is pivotally connected to the second handle. The torque spring includes an end in contact with the first pawl and another end in contact with the second handle for keeping a tip of the first pawl engaged with the ratchet of the lever. The second pawl and the handles are pivotally connected to one another. A helical spring includes an end connected to the second pawl and another end connected to the lever. The tips of the pawls are alternately engaged with the ratchet.

7 Claims, 8 Drawing Sheets

EFFORT-SAVING CUTTER

BACKGROUND OF INVENTION

1. Field of Invention

The present invention relates to a pipe cutter and, more particularly, to an effort-saving cutter.

2. Related Prior Art

A conventional cutter includes two handles, a blade connected to one of the handles and a platform connected to the remaining one of the handles. In operation, the handles are pivoted away from each other to pivot the blade away from the platform before a pipe is located between the blade and the platform. However, in the beginning of the cutting, the handles are far from each other and it is difficult for a user to hold and pivot the handles to each other.

The present invention is therefore intended to obviate or at least alleviate the problems encountered in the prior art.

SUMMARY OF INVENTION

It is the primary objective of the present invention to provide an effort-saving cutter.

To achieve the foregoing objectives, the cutter includes a platform, two handles, a blade, a lever and two pawls. The first handle includes a front portion connected to the platform. The lever includes a ratchet formed at a rear end and a block formed on a side. The blade includes a rear end formed with a slit for receiving the block. A first axle is inserted in the blade, the lever and the first handle. The first pawl includes a tip. A second axle is inserted in the first pawl and the second handle. A torque spring includes an end in contact with the first pawl and another end in contact with the second handle for keeping the tip of the first pawl engaged with the ratchet of the lever. The second pawl includes a tip. A third axle is inserted in the first and second handles and the second pawl. A helical spring includes an end connected to the second pawl and another end connected to the lever. The tip of the second pawl and the tip of the first pawl are alternately engaged with the ratchet.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
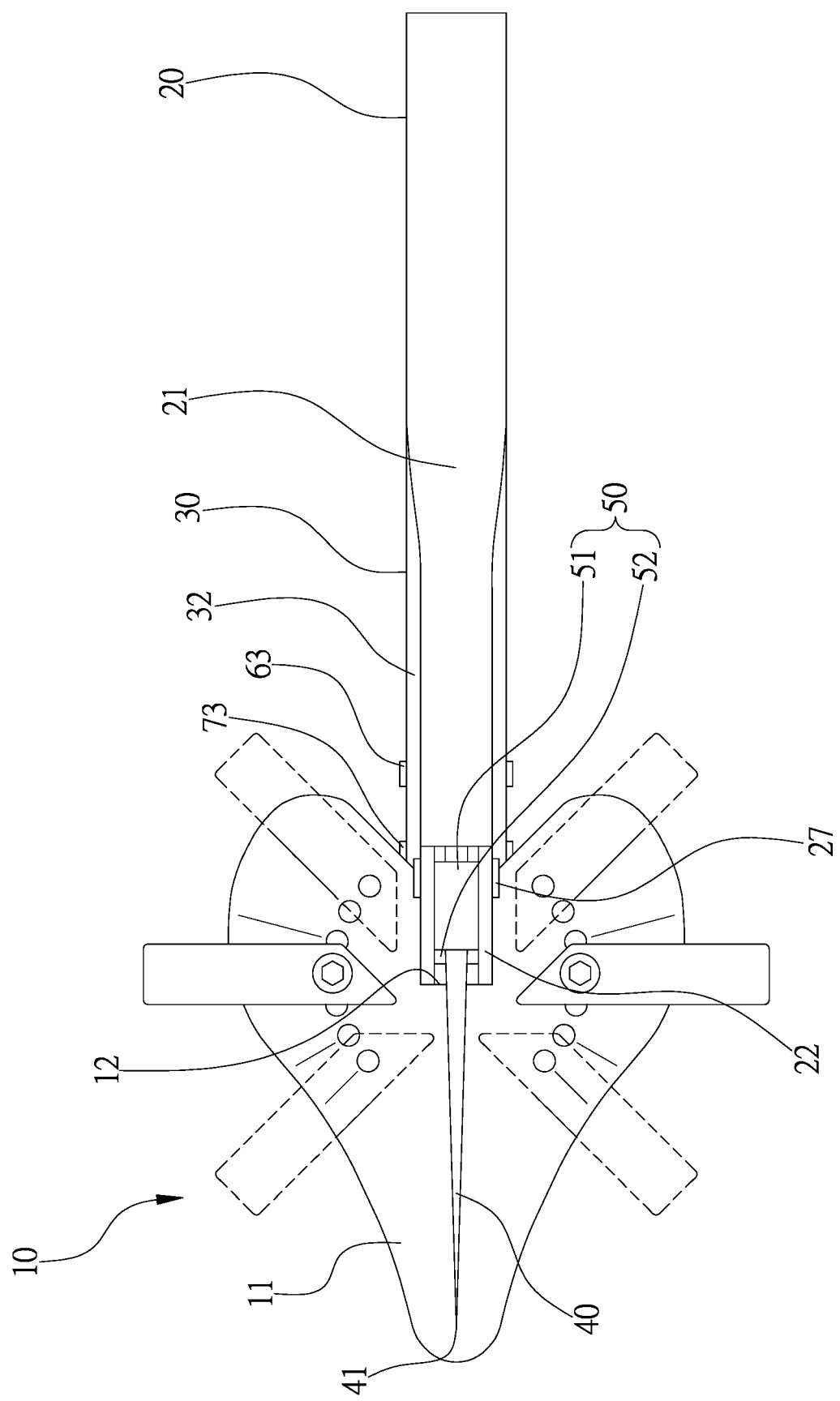
FIG. 1 is a top view of a cutter according to the preferred embodiment of the present invention.

Referring to FIGS. 1 to 6, a cutter 10 includes a platform 11, two handles 20 and 30, a blade 40, a lever 50, a pawl 60 and a pawl 70 according to the preferred embodiment of the present invention. The platform 11 includes a recess 12 cut in a rear portion and a fin 16 extending from a lower face.

Figure 2:
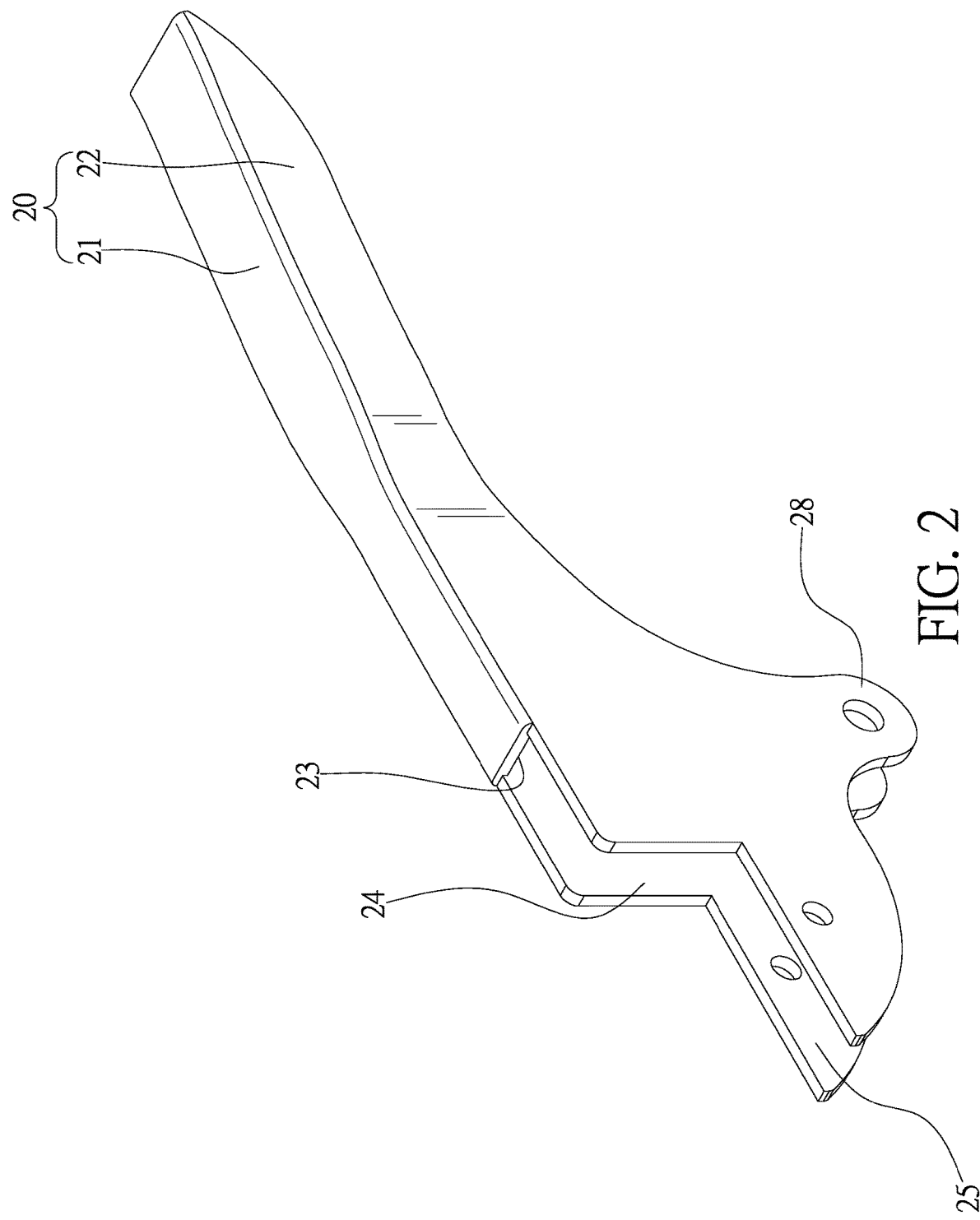
FIG. 2 is a perspective view of a handle of the cutter shown in FIG. 1.

Referring to FIGS. 1 and 2, the handle 20 is made by bending a piece of metal. The handle 20 includes top plate 21 formed between two lateral plates 22, thereby providing a space 23. Each of the lateral plates 22 includes a rear portion (not numbered), a front portion 25, a stepped portion 24 formed between the rear portion and the front portion 25, and a lug 28 extending from a lower edge. The front portions 25 of the lateral plates 22 extend beyond a front portion of the top plate 21 so that there is a gap (not numbered) between the front portions 25 of the lateral plates 22, in front of the front portion of the top plate 21.

The handle 30 includes a bottom plate 31 formed between two lateral plates 32. Thus, there is a space 33 above the bottom plate 31, between the lateral plates 32.

The blade 40 is formed with a sharp front end 41, an obtuse rear end 42, a slit 43 made in the rear end 42, an upper edge, and a cutting edge opposite to the upper edge. The slit 43 extends longitudinally into the blade 40.

Figure 3:
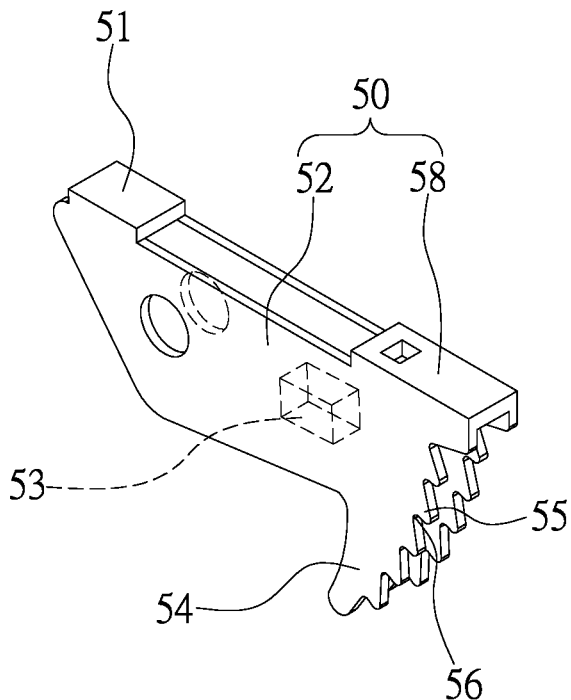
FIG. 3 is a perspective view of a lever of the cutter shown in FIG. 1.

Referring to FIGS. 1 and 3, the lever 50 includes a front top plate 51, a rear top plate 58, two lateral plates 52 and a block 53. The front plate 51 is formed between two lateral plates 52, and so is the rear top plate 58. The block 53 is also formed between the lateral plates 52. Each of the lateral plates 52 includes a ratchet 54 formed at a rear end. The ratchet 54 of each of the lateral plates 52 is formed with teeth 55 and spaces 56 along an edge. Each of the spaces 56 is made between two adjacent ones of the teeth 55. The teeth 55 are preferably ratchet teeth.

Figure 4:
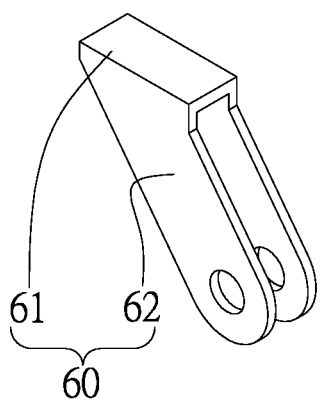
FIG. 4 is a perspective view of a first pawl of the cutter of FIG. 1.

Referring to FIGS. 1 and 4, the pawl 60 includes a middle plate 61 formed between two lateral plates 62.

Figure 5:
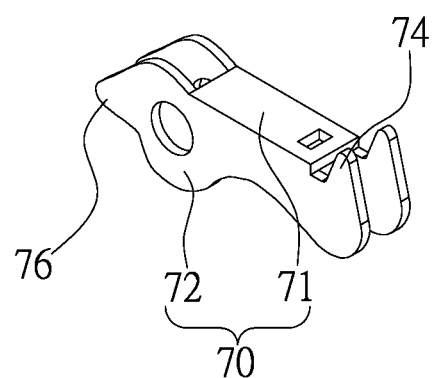
FIG. 5 is a perspective view of a second pawl of the cutter shown in FIG. 1.

Referring to FIGS. 1 and 5, the pawl 70 includes middle plate 71 formed between two lateral plates 72. Each of the lateral plates 72 is formed with two tips 74 and 76.

Figure 6:
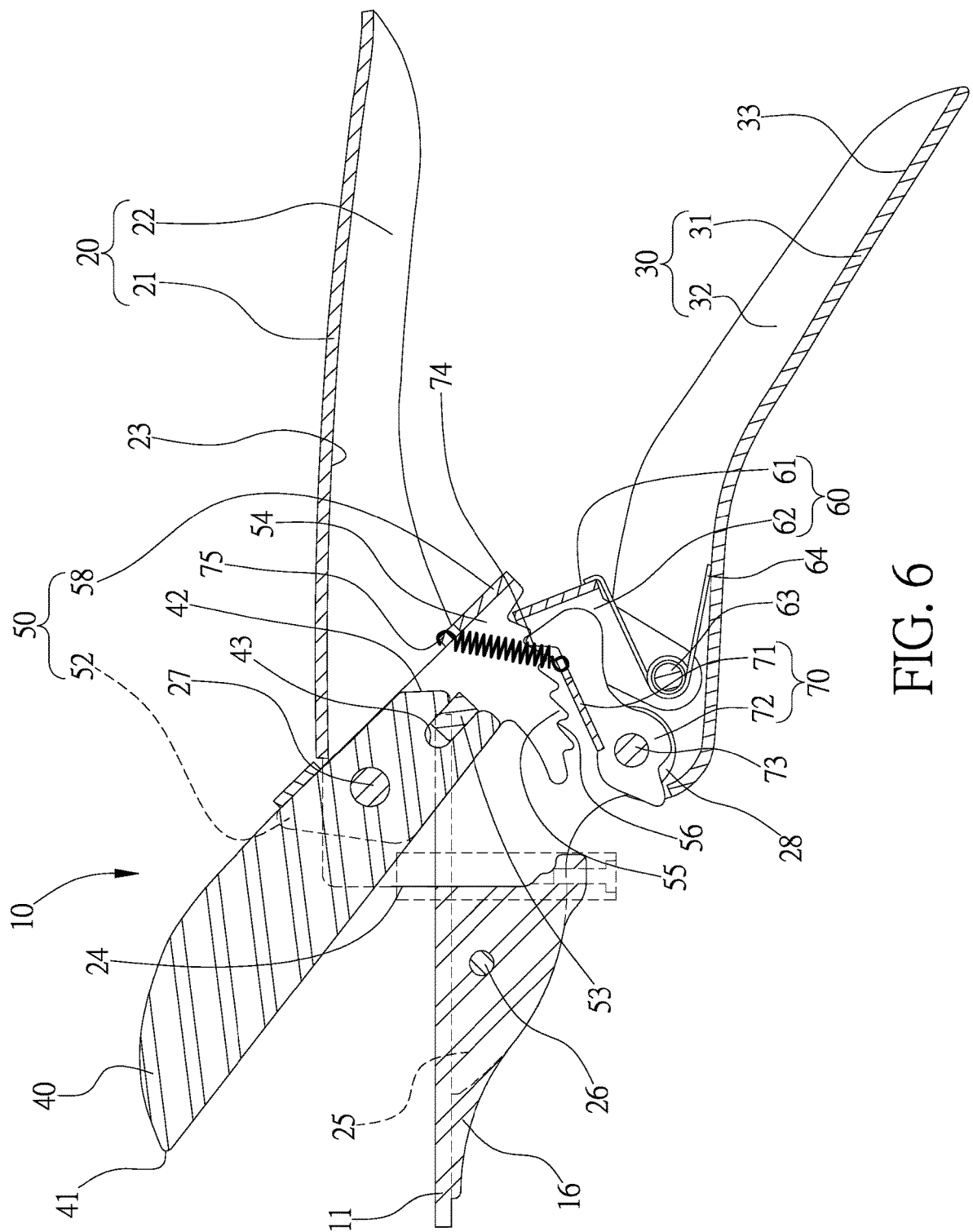
FIG. 6 is a cross-sectional view of the cutter shown in FIG. 1.

Referring to FIGS. 1 and 6, the stepped portions 24 of the lateral plates 22 of the handle 20 are inserted in the recess 12 of the platform 11 so that the platform 11 is supported on the front portions 25 of the lateral plates 22 of the handle 20. The fin 16 of the platform 11 is located between the front portions 25 of the lateral plates 22 of the handle 20. The fastener 26 is fitted in the front portions 25 of the lateral plates 22 and the fin 16 to connect the platform 11 to the handle 20.

A rear portion of the blade 40 is located between the lateral plates 52 of the lever 50. The block 53 is inserted in the slit 43. The front top plate 51 is preferably in contact with an upper edge of the blade 40. The lateral plates 52 of the lever 50 are located between the lateral plates 22 of the handle 20. An axle 27 is inserted in the lateral plates 22 of the handle 20, the lateral plates 52 of the lever 50 and the blade 40. Thus, the blade 40 and the lever 50 are pivotally connected to the handle 20. The front end 41 of the blade 40 extends to the exterior of the handle 20 above platform 11 via the gap between the front portions 25 of the lateral plates 22 of the handle 20. The front end 41 of the blade 40 can be pivoted toward or from the platform 11. There is an opening (not numbered) between a closed end of the recess 12 and the top plate 21 of the handle 20 to allow a front end 41 of the blade 40 to extend to a space above the platform 11.

The lateral plates 62 of the pawl 60 are located between the lateral plates 32 of the handle 30. An axle 63 is inserted in the lateral plates 32 of the handle 30 and the lateral plates 62 of the pawl 60 to pivotally connect the pawl 60 to the handle 30. The middle plate 61 is abutted against one of the teeth 55 and inserted in one of the spaces 56 of each of the ratchets 54 of the lever 50.

A torque spring 64 is used to keep the middle plate 61 of the pawl 60 against one of the teeth 55 of each of the ratchets 54 of the lever 50. The torque spring 64 includes a helical portion formed between two rectilinear portions. At least the helical portion of the torque spring 64 is located between lateral plates 62 of the pawl 60. The axle 63 is inserted in the helical portion of the torque spring 64 to keep the torque spring 64 in position. The first rectilinear portion of the torque spring 64 is in contact with the bottom plate 31 of the handle 30. The second rectilinear portion of the torque spring 64 is in contact with the middle plate 61 of the pawl 60. The second rectilinear portion of the torque spring 64 preferably includes a bent end for hooking the middle plate 61 of the pawl 60.

The lateral plates 72 of the pawl 70 are located between the lugs 28 of the handle 20. The lugs 28 of the handle 20 are located between the lateral plates 32 of the handle 30. An axle 73 is inserted in the lateral plates 32 of the handle 30, the lugs 28 of the handle 20 and the lateral plates 72 of the pawl 70 to pivotally connect the pawl 70 and the handles 20 and 30 to each other. The tip 74 of each of the lateral plates 72 of the pawl 70 is inserted in one of the spaces 56 of a corresponding one of the ratchets 54 of the lever 50.

A helical spring 75 is used to keep the tip 74 of each of the lateral plates 72 of the pawl 70 in contact with one of the teeth 55 of a corresponding one of the ratchets 54 of the lever 50. The helical spring 75 is formed with a first end connected to the rear top plate 58 of the lever 50 and a second end connected to the middle plate 71 of the pawl 70.

The axles 27, 63 and 73 are preferably rivets. However, each of the axles 27, 63 and 73 can be a combination of threaded bolt with a nut.

Preferably, the handle 20 includes a portion with a reduced width so that this portion of the handle 20 can be inserted in the handle 30. In specific, a distance between external faces of the lugs 28 of the handle 20 is marginally smaller than a distance between internal faces of the lateral plates 32 of the handle 30 so that the lugs 28 of the handle 20 can be located between the lateral plates 32 of the handle 30. The remaining portion of the handle is preferably as wide as the handle 30.

Referring to FIG. 6, in a first phase of a cutting operation, the middle plate 61 is inserted in the first space 56 of each of the ratchets 54 of the lever 50. Now, the angle between the cutting edge of the blade 40 and an upper face of the platform 11 is large. A pipe (not shown) is located between the blade 40 and the platform 11. There is a small angle between the handles 20 and 30. Hence, it is easy for a user to hold and pivot the handles 20 and 30 toward each other to bring the blade 40 toward the platform 11 to cut the pipe. In detail, the handle 30 pivots the pawl 60. The pawl 60 pivots the lever 50. The lever 50 pivots the blade 40. The torque spring 64 is loaded.

Figure 7:
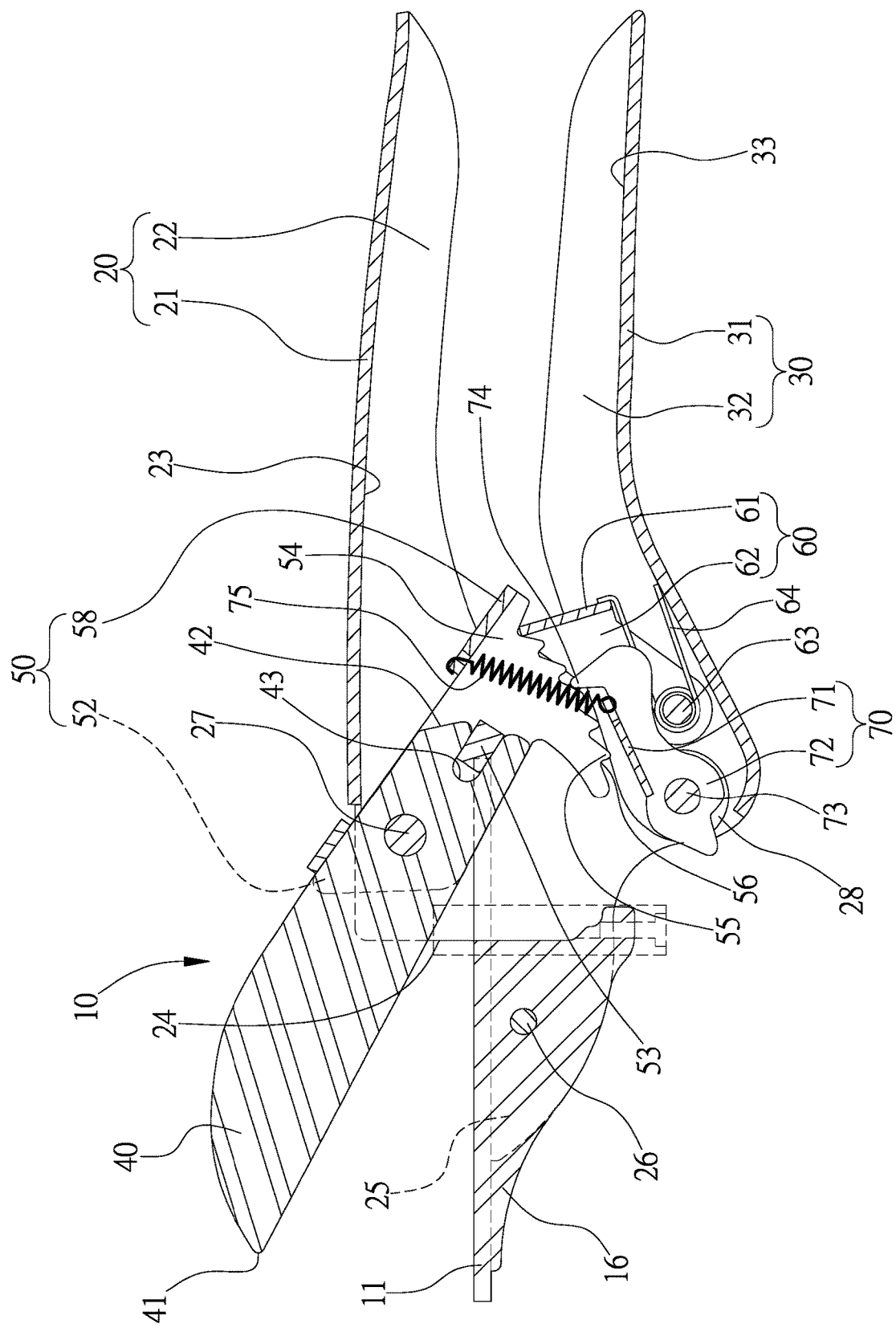
FIG. 7 is a cross-sectional view of the cutter in another position than shown in FIG. 6.

Referring to FIG. 7, at the end of the first phase of the cutting operation, the handles 20 and 30 are as close to each other as possible. The pipe has not been completely cut by the blade 40 by now.

The user releases the handle 30 to allow the torque spring 64 to pivot the handle 30 from the handle 20 about the axle 73. The handle 30 moves the axle 63. The axle 63 moves the pawl 60 so that the middle plate 61 of the pawl 60 is moved into the second space 56 from the first space 56 of each of the ratchets 54 of the lever 50.

The pawl 70 is engaged with the ratchets 54 of the lever 50 while the pawl 60 is disengaged from the ratchets 54 of the lever 50. In detail, the tip 74 of each of the lateral plates 72 of the pawl 70 is inserted in the third space 56 of a corresponding one of the ratchets 54 of the lever 50 for example. Thus, the blade 40 is kept in position relative to the platform 11.

Then, the user pivots the handle 30 toward the handle 20 again to bring the cutting operation into a second phase. The middle plate 61 is inserted in the second space 56 of each of the ratchets 54 of the lever 50 for example. The angle between the blade 40 and the platform 11 is smaller in the second phase than in the first phase because the pipe is partially cut. There is still a small angle between the handles 20 and 30. Hence, it is still easy for the user to hold and pivot the handles 20 and 30 toward each other again to bring the blade 40 further toward the platform 11 to further cut the pipe.

The pawl 60 moves the rear end of the lever 50 from the pawl 70 as the user pivots the handle 30 toward the handle 20. Thus, the tip 74 of each lateral plate 72 of the pawl 70 is moved into the fourth space 56 from the third space 56 of the corresponding one ratchet 54.

At the end of the second phase of the cutting operation, the handles 20 and 30 are as close to each other as possible. The pipe has not been completely cut by the blade 40 by now.

The user releases the handle 30 to allow the torque spring 64 to pivot the handle 30 from the handle 20 about the axle 73. The handle 30 moves the axle 63. The axle 63 moves the pawl 60 so that the middle plate 61 of the pawl 60 is moved into the third space 56 from the second space 56 of each of the ratchets 54 of the lever 50.

The pawl 70 is engaged with the ratchets 54 of the lever 50 while the pawl 60 is disengaged from the ratchets 54 of the lever 50. In detail, the tip 74 of each lateral plate 72 of the pawl 70 is kept in the fourth space 56 of the corresponding ratchet 54 of the lever 50 for example. Thus, the blade 40 is kept in position relative to the platform 11.

Then, the user pivots the handle 30 toward the handle 20 again to bring the cutting operation into a third phase. The middle plate 61 is inserted in the third space 56 of each of the ratchets 54 of the lever 50 for example.

Figure 8:
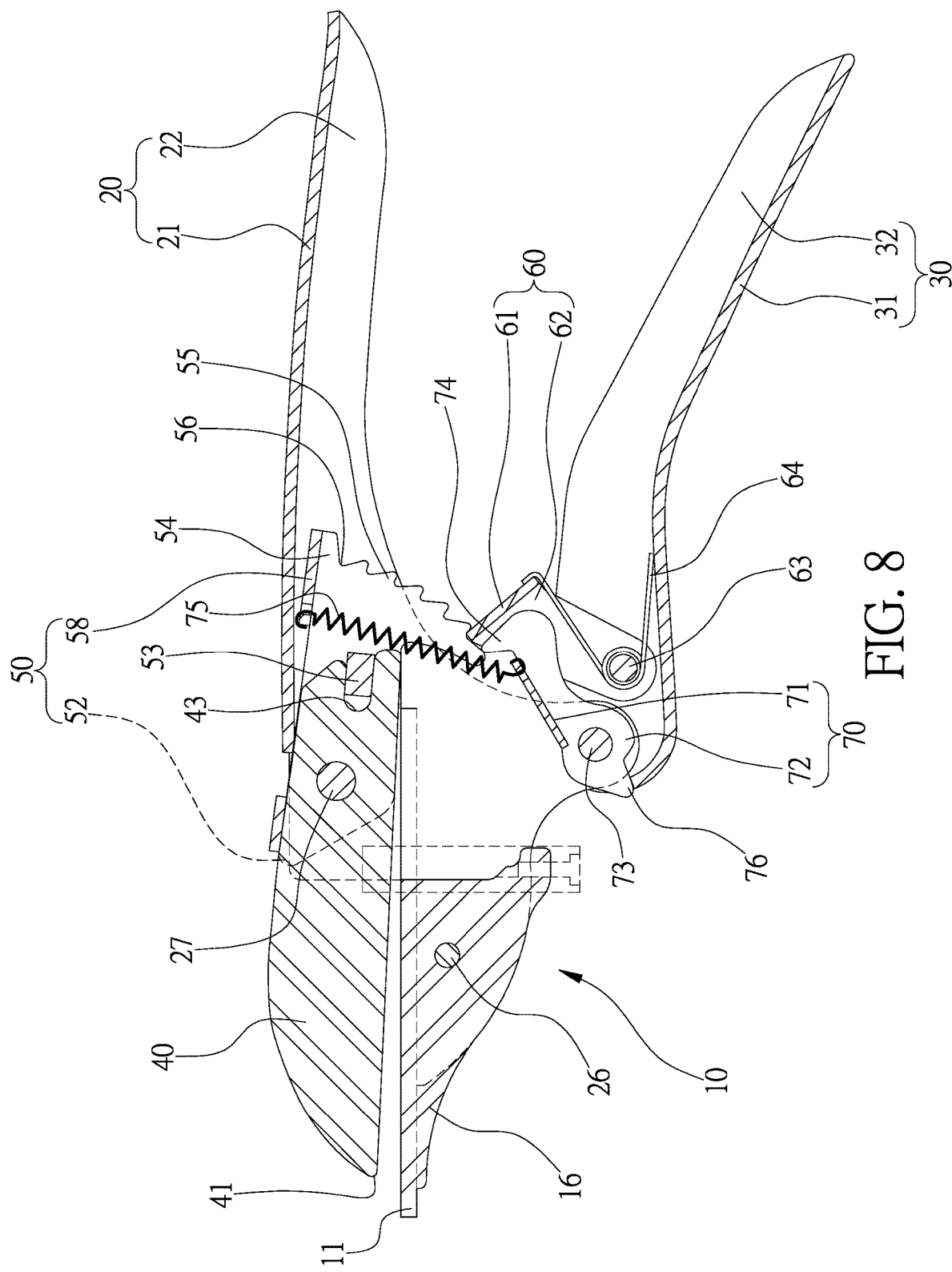
FIG. 8 is a cross-sectional view of the cutter in another position than shown in FIG. 7.

Referring to FIG. 8, in a final phase of the cutting operation, the middle plate 61 of the pawl 60 is inserted in the last space 56 of each of the ratchets 54 of the lever 50. The angle between the blade 40 and the platform 11 is smaller in the final phase than in any previous phase. There is still a small angle between the handles 20 and 30. Hence, it is still easy for a user to hold and pivot the handles 20 and 30 toward each other again to bring the blade 40 further toward the platform 11 to further cut the pipe.

Figure 9:
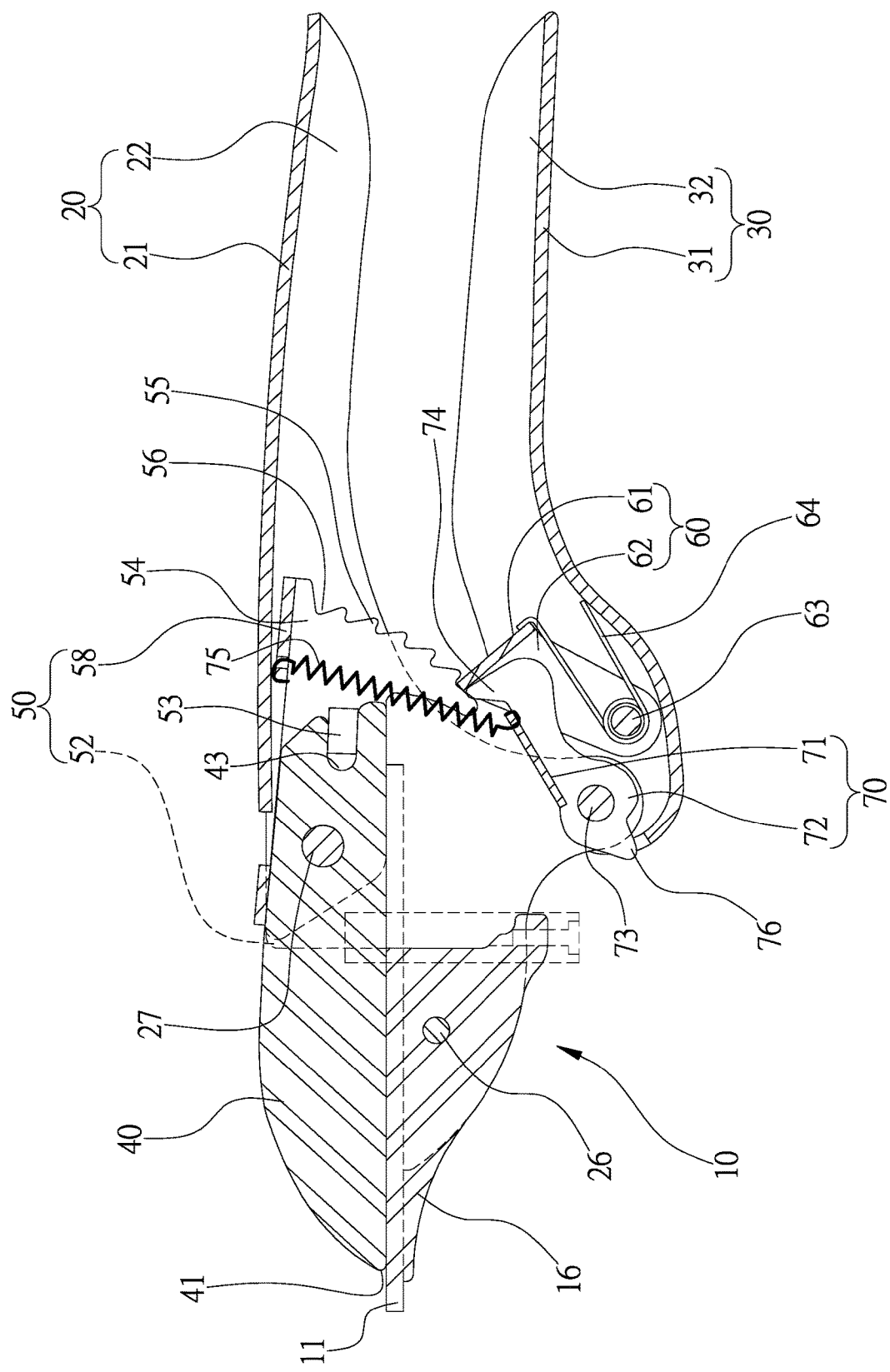
FIG. 9 is a cross-sectional view of the cutter in another position than shown in FIG. 8.

Referring to FIG. 9, at the end of the final phase of the cutting operation, the handles 20 and 30 are as close to each other as possible. The pipe is completely cut by the blade 40.

Figure 10:
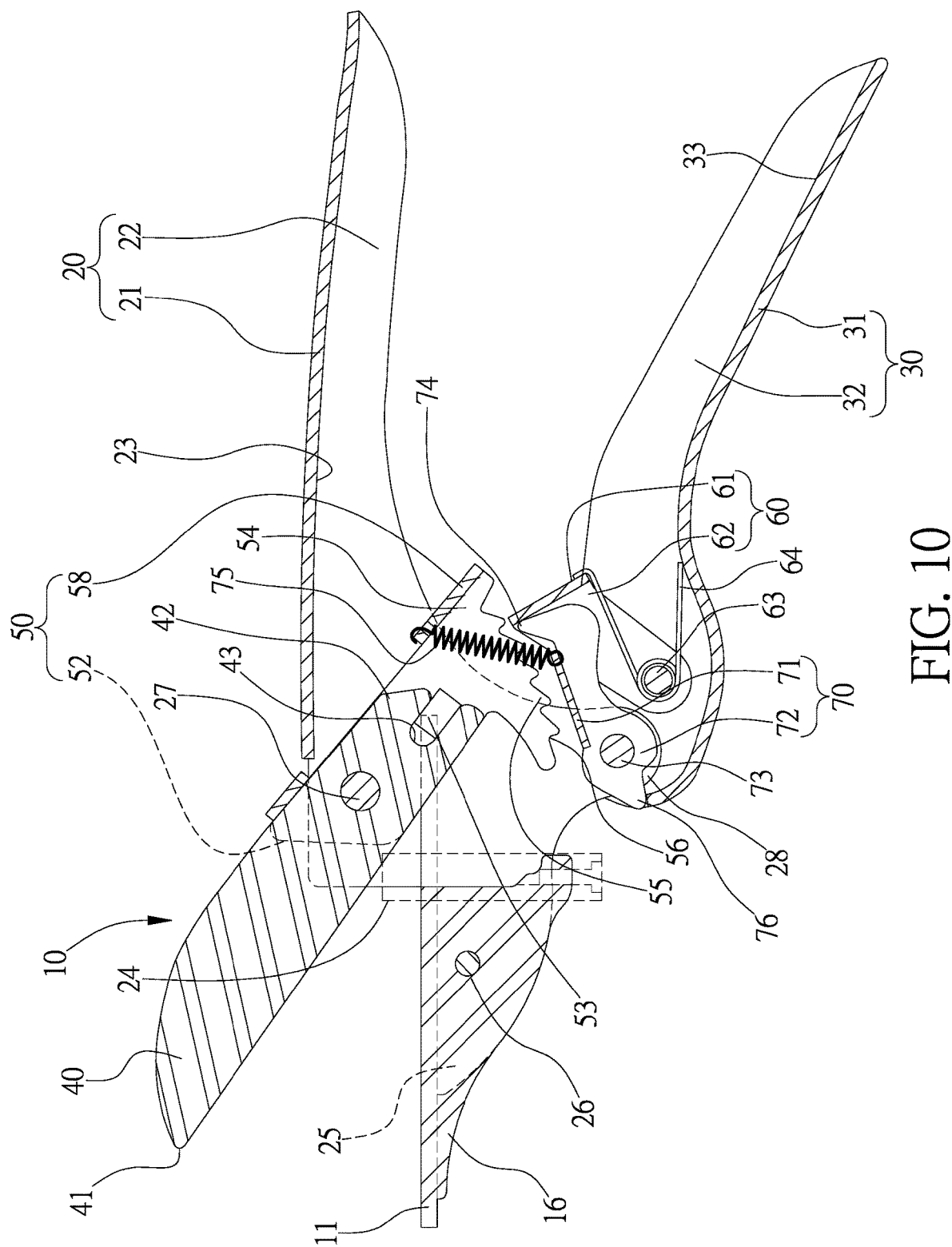
FIG. 10 is a cross-sectional view of the cutter in another position than shown in FIG. 9.

Referring to FIG. 10, to bring the cutter 10 back to the original position, the handle 30 is pivoted away from the handle 20 so that a front end of the bottom plate 31 of the handle 30 abuts against the tips 76 of the lateral plates 72 of the pawl 70. Thus, the pawl 70 is pivoted. Then, the tips 74 of the lateral plates 72 of the pawl 70 are disengaged from the ratchets 54 of the lever 50 to allow the helical spring 75 to pivot the blade 40 from the platform 11, i.e., to enlarge the angle between the blade 40 and the platform 11. Finally, the middle plate 61 of the pawl 60 is inserted in the first space 56 of each of the ratchets 54 of the lever 50 again. Now, the cutter 10 is ready for another cutting operation.

The present invention has been described via the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A cutter comprising:
    a platform formed with a fin;
    a first handle comprising two lateral plates each of which comprises a front portion, wherein the fin is located between the front portions of the lateral plates of the first handle;
    a second handle comprising two lateral plates located on two sides of the lateral plates of the first handle;
    a lever comprising:
        two lateral plates located between the lateral plates of the first handle, wherein each of the lateral plates of the lever comprises a ratchet;
        a top plate formed on the lateral plates of the lever; and
        a block formed between the lateral plates;
    a blade comprising a rear end formed with a slit for receiving the block of the lever when the blade is located between the lateral plates of the lever;
    a first axle inserted in the blade, the lateral plates of the lever and the lateral plates of the first handle;
    a first pawl comprising two lateral plates and a middle plate formed between the lateral plates of the first pawl;
    a second axle inserted in the lateral plates of the second handle and the lateral plates of the first pawl;
    a torque spring comprising an end in contact with the middle plate of the first pawl and another end in contact with the second handle for keeping the middle plate of the first pawl engaged with the ratchets of the lever;
    a second pawl comprising two lateral plates and a middle plate formed between the lateral plates of the second pawl, wherein each the lateral plates of the second pawl comprises a first tip;
    a third axle inserted in the lateral plates of the second handle, the lateral plates of the first handle and the lateral plates of the second pawl;
    a helical spring comprising an end connected to the middle plate of the second pawl and another end connected to the top plate of the lever;
    wherein the first tips of the lateral plates of the second pawl and the middle plate of the first pawl are alternately engaged with the ratchets.

2. The cutter according to claim 1, wherein each of the lateral plates of the first handle comprises a lug located between the lateral plates of the second handle, wherein the third axle is inserted in the lugs.

3. The cutter according to claim 1, wherein the first handle comprises a top plate formed between the lateral plates of the first handle, wherein the platform comprises a recess for receiving the lateral plates of the first handle, wherein there is an opening between a closed end of the recess and the top plate of the first handle to allow a front end of the blade to extend to a space above the platform from the lever.

4. The cutter according to claim 2, wherein each of the lateral plates of the first handle comprises a stepped portion formed between the front portion and a rear portion, wherein the stepped portions of the lateral plates of the first handle are inserted in the recess.

5. The cutter according to claim 1, wherein the second handle comprises a bottom plate formed between the lateral plates of the second handle, wherein the bottom plate pushes a second tip of each of the lateral plates of the second pawl to disengage the first tip of each of the lateral plates of the second pawl from a corresponding one of the ratchets of the lever when the second handle is completely pivoted away from the first handle.

6. A cutter comprising:
    a platform;
    a first handle comprising a front portion connected to the platform;
    a second handle;
    a lever comprising a ratchet formed at a rear end and a block formed on a side;
    a blade comprising a rear end formed with a slit for receiving the block of the lever;
    a first axle inserted in the blade, the lever and the first handle;
    a first pawl comprising a tip;
    a second axle inserted in the first pawl and the second handle;
    a torque spring comprising an end in contact with the first pawl and another end in contact with the second handle for keeping the tip of the first pawl engaged with the ratchet of the lever;
    a second pawl comprising a tip;
    a third axle inserted in the first and second handles and the second pawl; and
    a helical spring comprising an end connected to the second pawl and another end connected to the lever;
    wherein the tip of the second pawl and the tip of the first pawl are alternately engaged with the ratchet.

7. The cutter according to claim 1, wherein the first handle comprises a lug extending from a lower edge, wherein the third axle is inserted in the lug.

* * * * *